United States Patent [19] [11] 4,117,814
Takahashi [45] Oct. 3, 1978

[54] INTAKE REGULATOR FOR INTERNAL COMBUSTION ENGINE
[75] Inventor: Akira Takahashi, Kyoto, Japan
[73] Assignee: Mitsubishi Jidosha Kogyo Kabushiki Kaisha, Japan
[21] Appl. No.: 808,623
[22] Filed: Jun. 21, 1977
[30] Foreign Application Priority Data
Mar. 4, 1977 [JP] Japan .................................. 52-24024
[51] Int. Cl.² .......................................... F02M 25/06
[52] U.S. Cl. ............................. 123/119 A; 123/119 R; 123/124 R; 123/119 D
[58] Field of Search ........ 123/119 A, 119 R, 119 EC, 123/119 D, 124 R, 119 DB

[56] References Cited
U.S. PATENT DOCUMENTS

| | | | |
|---|---|---|---|
| 3,800,766 | 4/1974 | Schubeck | 123/119 A |
| 3,827,414 | 8/1974 | Sarto | 123/119 A |
| 3,906,909 | 9/1975 | Garcea | 123/119 A |
| 3,962,868 | 6/1976 | Matumoto et al. | 123/119 A |
| 3,992,878 | 11/1976 | Moorman | 123/119 A |
| 4,002,154 | 1/1977 | Kestner | 123/119 A |
| 4,008,697 | 2/1977 | Konno | 123/119 A |
| 4,013,052 | 3/1977 | Masaki et al. | 123/119 A |
| 4,056,084 | 11/1977 | Baumgartner | 123/119 A |
| 4,073,262 | 2/1978 | Aoyama et al. | 123/119 A |

Primary Examiner—Wendell E. Burns
Attorney, Agent, or Firm—Robert E. Burns; Emmanuel J. Lobato; Bruce L. Adams

[57] ABSTRACT

An intake regulator suitable for use in an automotive internal combustion engine, selects to recirculate the exhaust-gas to an intake passage or to introduce air for dilution of the air-fuel mixture, depending on the specific operating conditions. Smooth shift between the recirculation of the exhaust-gas and the introduction of air by orifices and check valves in the pneumatic intake regulator reduces the formation of nitrogen oxides to a minimum, while keeping the impairment of fuel cost and driveability to a minimum.

7 Claims, 8 Drawing Figures

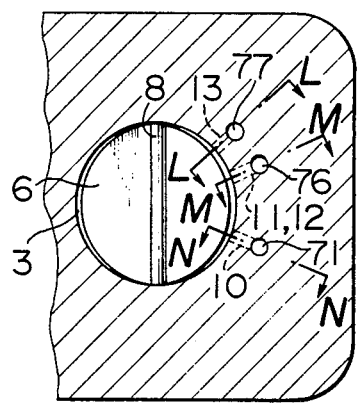
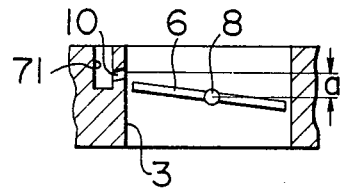
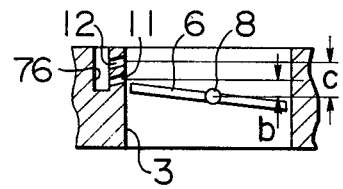
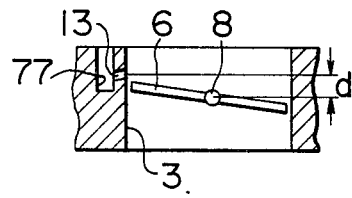
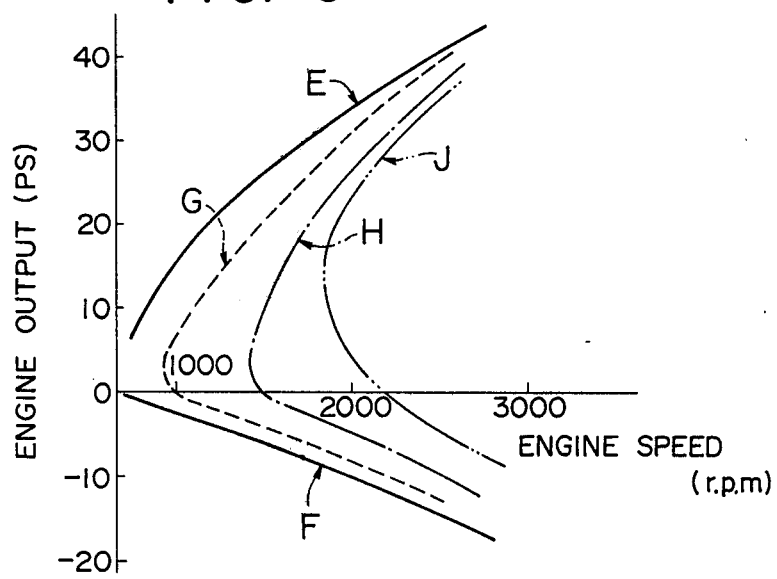

INTAKE REGULATOR FOR INTERNAL COMBUSTION ENGINE

BACKGROUND OF THE INVENTION

This invention relates to an apparatus for controlling quantity of the exhaust-gas and the air supplied into the intake system, (hereinafter referred to as "intake regulator"), of the internal combustion engine depending on its operating conditions.

Generally, exhaust-gas recirculation systems for the internal combustion engine are provided to decrease noxious nitrogen oxides in the engine exhaust-gas. They reduce the nitrogen oxides emissions by lowering the combustion temperature by recirculating part of the exhaust-gas through the engine intake system into the cylinders.

But, the recirculation of the exhaust-gas is usually accompanied by a decrease in fuel combustion efficiency in the cylinders. Excessive exhaust-gas recirculation sharply lowers power output and mileage, impairs driveability, and causes engine stop and other troubles.

Therefore, the quantity of recirculated exhaust-gas has been controlled by complex procedures according to varying engine operating conditions, with consideration for nitrogen oxides emissions, power output and mileage.

In addition to the aforesaid exhaust-gas recirculation system, the lean mixture combustion system has been known as a measure of reducing the production of nitrogen oxides in the combustion process. This system comprises achieving good combustion of an air-fuel mixture whose air-fuel ratio is considerably larger than stoichiometric, as between 16 and 23, for instance. Since such lean air-fuel mixtures, in general, are low in ignitability and combustibility, various corrective measures have been employed.

For example, auxiliary combustion chamber, stratified-charge and turbulence methods are known. These methods improve ignitability by leading a layer of rich mixture of air and fuel to or scavenging the vicinity of the spark plug and enhance combustibility by increasing the flame propagation speed by producing strong turbulent flow.

The above-mentiond two nitrogen oxides reducing systems have both merits and demerits. The exhaust-gas recirculation system achieves high nitrogen oxides reduction, but impairs power output and mileage, as mentioned before. In contrast, the lean mixture combustion system involves difficult air-fuel ratio control in the carburetor and low nitrogen oxides reduction, but improves mileage and provides better driveability as compared with the exhaust-gas recirculation system.

SUMMARY OF THE INVENTION

The principal object of this invention is to provide an intake regulator for internal combustion engine that permits reducing the production of nitrogen oxides by supplying part of the exhaust gas and air to the intake system according to operating conditions of the engine.

Another object of this invention is to provide an intake regulator especially for automotive internal combustion engine that reduces the production of nitrogen oxides to a minimum, while keeping the impairment of power output, mileage and driveability to a minimum.

Still another object of this invention is to provide an intake regulator especially for automotive internal combustion engine that insures smooth shifting between the exhaust-gas recirculation and the supply of fuel-diluting air without causing overlap, stoppage or other time-lag, knock-free engine operation, good driveability during said shifting, and high reduction in nitrogen oxide emissions.

Yet another object of this invention is to provide an intake regulator especially for automotive internal combustion engine that reduces nitrogen oxides mainly by recirculating the exhaust-gas in the low-speed operating range employed mostly in the city, and reduces nitrogen oxides emissions and improves mileage by supplying the fuel-diluting air in the high-speed operating range employed mostly outside the city.

A further object of this invention is to provide a pneumatic intake regulator featuring simple construction, low cost and high reliability.

The aforesaid objects are achieved by an intake regulator for internal combustion engine which comprises an exhaust-gas recirculation passage connecting the exhaust passage with the intake passage to recycle part of the exhaust-gas back to the intake passage, a recirculated exhaust-gas control valve in said exhaust-gas recirculation passage for controlling the quantity of the recirculated exhaust-gas, differential-pressure responsive means actuating said recirculated exhaust-gas control valve by a vacuum established in a vacuum chamber thereof leading to the intake passage, an air passage for diluting air-fuel mixture by supplying air into the intake passage or the fuel passage in the carburetor, an air control valve in said air passage for controlling the quantity of air supply, differential-pressure responsive means actuating said air control valve by a vacuum established in a vacuum chamber thereof leading to the intake passage, open-to-atmosphere passages leading from each of said two vacuum chambers, and valve control means closing either of said recirculated exhaust-gas control valve and said air control valve when the other is open by opening and closing said open-to-atmosphere passages.

BRIEF DESCRIPTION OF THE DRAWINGS

Now embodiments of this invention will be described in detail by reference to the accompanying drawings FIGS. 1 through 8, in which substantially similar parts and members are designated by similar reference numerals.

FIG. 2 is a cross-sectional view looking in the direction of the arrow K—K of FIG. 1.

FIG. 3 is a cross-sectional view looking in the direction of the arrow N—N of FIG. 2.

FIG. 4 is a cross-sectional view looking in the direction of the arrow M—M of FIG. 2.

FIG. 5 is a cross-sectional view looking in the direction of the arrow L—L of FIG. 2.

FIG. 6 is an engine power output chart illustrative of the operation of the first embodiment.

DESCRIPTION OF THE PREFERRED EMBODIMENTS

Figure 1:
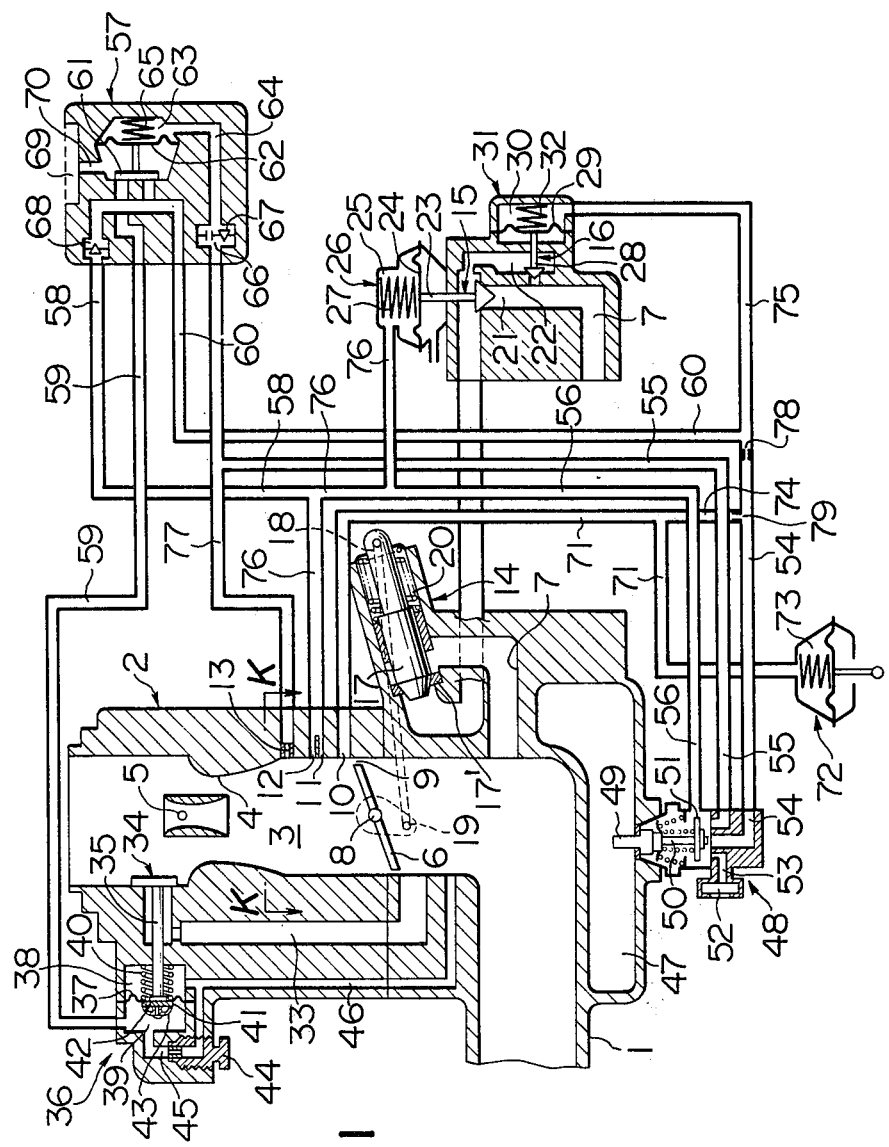
FIG. 1 is a cross-sectional view of a first embodiment of this invention.

In a first embodiment of this invention illustrated in FIG. 1, an intake manifold 1 to distribute the air-fuel mixture to the cylinders of an automotive multi-cylinder internal combustion engine, now shown, lies below a carburetor of the conventional, ordinary type. The mixture is produced by mixing the air, cleaned in the air cleaner not shown and coming down through an intake passage 3, with the fuel injected from a main nozzle 5 in the vicinity of a venturi 4 of the carburetor 2 or from a slow fuel port made in the intake pipe wall near a throttle valve 6, then with the exhaust-gas, in the intake manifold 1, supplied from an exhaust-gas recirculation passage 7.

Interlocked with an accelerator pedal not shown, the throttle valve 6 rotates about a throttle shaft 8. In the intake passage wall approximately opposite to the upstream-side edge 9 of the throttle valve 6 and slightly upstream of the full-close position thereof, there are perforated four ports 10, 11, 12 and 13. In this embodiment, the distances $a$, $b$, $c$ and $d$ from the center of the throttle shaft 8 to the ports 10, 11, 12 and 13, with the throttle bore diameter ranging between 26 and 30 mm, are established as follows: $a \approx 3.0$ to $4.0$ mm, $b \approx 2.5$ to $3.0$ mm, $c \approx 6.0$ to $7.0$ mm, and $d \approx 4.0$ to $6.0$ mm. Here, it should be noted that the ports 10 to 13 in FIG. 1 are illustrated at positions different from their actual positions for convenience of the illustration of the vacuum passages to be described later. The actual port positions are as illustrated in FIGS. 2 through 5. Said exhaust-gas recirculation passage 7 communicates with the intermediate portion of an exhaust passage not shown at one end, and opens into the intake manifold 1 at the other. Three recirculated exhaust-gas control valves 14, 15 and 16 to open and close the exhaust-gas recirculation passage 7 are provided therein, with the valves 15 and 16 being located upstream of the valve 14 and arranged in parallel.

On end of a link 18 connects with the rear end of a valve body 17 of the control valve 14 that comes in contact with the edge of a valve seat 17' provided in the recirculated exhaust-gas passage 7. The other end of said link 18 connectes with the free end of a lever 19 fixed to said throttle shaft 8. A spring 20 urges the valve body 17 in the closing direction. The control valve 15 opens and closes a main passage 21 of the exhaust-gas recirculation passage 7, and the control valve 16 opens and closes its bypass 22. A valve body 23 of the control valve 15, fixed to the center of a diaphragm 24 and urged by a spring 27 in the closing direction, is actuated by a differential-pressure responsive device 26 comprising said diaphragm 24 and a vacuum chamber 25 on one side thereof.

Likewise, a valve body 28 of the control valve 16, fixed to the center of a diaphragm 29 and urged by a spring 32 in the closing direction, is actuated by a differential-pressure responsive device 31 comprising said diaphragm 29 and a vacuum chamber 30 on one side thereof.

The carburetor 2 has a bypassing air passage 33 leading from above the throttle valve 6 to the downstream side thereof, which is provided with a control valve 34 whose valve body 35 is opened and closed by a differential-pressure responsive device 36.

Said differential-pressure responsive device 36 comprises a diaphragm 37, to the center of which is fixed said valve body 35 that is urged by a spring 40 in the direction to close the air passage 33, and two vacuum chambers 38 and 39 separated by said diaphragm 37.

To the center of said diaphragm 37 is also fitted a check valve body 41, which is perforated with an airport 42 through which said two vacuum chambers 38 and 39 communicate with each other and fitted with a check valve 43 that permits the passage of the fluid through said air-port 42 only from the chamber 38 to the chamber 39 and not in the opposite direction.

Of said vacuum chambers 38 and 39, the chamber 39 communicates with the chamber 38 through a vacuum passage 45 having an orifice 44, while the chamber 38 communicates with that portion of the intake passage 3 which is downstream of the throttle valve 6 through a vacuum passage 46. Below the intake manifold 1 is provided a cooling water passage 47 that constitutes the heat riser, and a thermostatic valve 48 is fitted to said passage 47.

Said thermostatic valve 48 has a wax element 49 protruding into said cooling water passage 47, and the thermal expansion and contraction of said wax element 49 displaces a rod 50, thereby closing and opening a valve body 51, respectively. When the valve body 51 opens, three open-to-atmosphere passages 54, 55 and 56 are simultaneously connected with an open-to-atmosphere port 53 covered with an air filter 52. When the valve body 51 closes, the communications of said three passages 54, 55 and 56 with the open-to-atmosphere port 53 and with each other are cut off.

A valve control device 57 may be fitted in a suitable position in the engine body or engine room not shown. Said valve control device 57 comprises an open-close valve 61 that opens and closes three open-to-atmosphere passages 58, 59 and 60 simultaneously, an open-to-atmosphere port 70 covered with an air filter 69 that communicates with said passages 58, 59 and 60 when said open-close valve 61 opens, a diaphragm 62 that actuates said open-close valve 61, a vacuum chamber 63 formed on one side of said diaphragm 62, a vacuum passage 64 that introduces vacuum to said chamber 63, and a spring 65 that urges the diaphragm 62 in the direction to close the open-close valve 61. The vacuum passage 64 is provided with an orifice 66 and a check valve 67 arranged in parallel, and the open-to-atmosphere passage 58 with a check valve 68.

Of said four ports 10, 11, 12 and 13 made in the carburetor 2, the port 10 communicates with a vacuum chamber 73 of a vacuum-type ignition advancer 72 through a vacuum passage 71, with the open-to-atmosphere passage 54, which is opened and closed by said thermostatic valve 48, through a passage 74 branched from the vacuum passage 71, and with the vacuum chamber 30 of the differential-pressure responsive device 31 through a vacuum passage 75.

The ports 11 and 12 communicate with the vacuum chamber 25 of the differential-pressure responsive device 26 through a vacuum passage 76, with the open-to-atmosphere passage 58 branched from the point midway of the vacuum passage 76 and opened and closed by the valve control device 57, and with the open-to-atmosphere passage 56 opened and closed by the thermostatic valve 48. Further, the port 13 communicates with the vacuum passage 64 of the valve control device 57 through a vacuum passage 77, and with the open-to-atmosphere passage 55 branched from the vacuum passage 77 and opened and closed by the thermostatic valve 48.

Of the open-to-atmosphere passages 59 and 60 opened and closed by the valve control device 57, the passage 59 communicates with the vacuum chamber 39 of the differential-pressure responsive device 36, while the passage 60 communicates with the intermediate point of the vacuum passage 75 leading to the vacuum chamber 30 of the differential-pressure responsive device 31. The vacuum passage 75 between the open-to-atmosphere passage 60 and the vacuum passage 74 has an orifice 78, and the passage 74 between the open-to-atmosphere passage 54 and the vacuum passage 71 has an orifice 79.

The ports 11 and 12, with their diameter constricted to between approximately 0.8 and 1.6 mm, function like orifices. The port 13 also functions likewise, with its diameter constricted to between approximately 0.9 and 1.0 mm.

In the above-described arrangement, a vacuum occurring in the intake passage 3 downstream of the throttle valve 6 during engine operation (hereinafter called the intake manifold vacuum) flows through the vacuum passage 46 to the vacuum chamber 38, and also through the vacuum passage 45 having the orifice 44 to the vacuum chamber 39.

Accordingly, when no air is supplied through the open-to-atmosphere passage 59, the intake manifold vacuum is introduced to the vacuum chambers 38 and 39 as it is.

If the throttle valve 6 closes rapidly under such conditions, the intake manifold vacuum increases rapidly, and the increased vacuum is transmitted through the vacuum passage 46 into the vacuum chamber 38 to increase the vacuum therein instantly. Meanwhile, the transmission of the increased vacuum to the vacuum chamber 39 is made through the vacuum passage 45 having the orifice 44. Due to the resistance to flow thereat, the vacuum in the vacuum chamber 39 starts to increase after some time, and at a slower rate. This causes a pressure difference between the two chambers 38 and 39. As a consequence, the diaphragm 37 moves to the right against the force of the spring 40, thus opening the control valve 34 and supplying the air, introduced from above the throttle valve 6 in the intake passage 3, thrugh the air passage 33 into the intake passage downstream of said throttle valve 6. The air thus supplied dilutes the air-fuel mixture that otherwise tends to become richer as a result of the rapid vaporization of the unvaporized fuel on the internal wall of the intake manifold 1 caused by the increase in the intake manifold vacuum.

Under low-load conditions where the throttle valve 6 is fully or nearly fully closed, the intake manifold pressure is very high. Under medium-load conditions where the throttle valve 6 is hald-opened, the intake manifold vacuum lowers again. The decreased vacuum is transmitted through the vacuum passage 46 to the chamber 38. It is also transmitted to the chamber 39 through the passage 45 having the orifice 44, and also, as the check valve 43 opens, from the chamber 38 through the airport 42. Therefore, the vacuums in the chambers 38 and 39 follow a change in the intake manifold vacuum with little delay.

Since the control valve 34 opens during rapid deceleration, the enrichment of the air-fuel mixture is prevented, and the production of hydrocarbons, carbon monoxide and other noxious unburned gases is decreased. In addition, provision of the check valve 43 is conducive to assuring the accurate operation of the control valve 34 responsive to all deceleration steps continuously repeated in a short time, as in the case of gear shifting. This effectively checks an increase in the production of the unburned gases.

A vacuum occurring in the port 10 of the carburetor 2 (hereinafter called the dis-boost) is introduced through the vacuum passage 71 to the vacuum chamber 73 of the vacuum-type ignition advancer 73, thus controlling the ignition timing of the distributor not shown. The dis-boost is also introduced through the passage 74 and the vacuum passage 75 to the vacuum chamber 30 of the differential-pressure responsive device 31, and actuates the control valve 16.

A resultant vacuum (hereinafter called the EGR boost), which is a sum of vacuums occurring in the ports 11 and 12 of the carburetor 2, is introduced through the vacuum passage 76 into the vacuum chamber 25 of the differential-pressure responsive device 26, and actuates the control valve 15. Further, a vacuum occurring in the port 13 of the carburetor 2 (hereinafter called the VCU vacuum) is introduced through the vacuum passages 77 and 64 into the vacuum chamber of the valve control device 57, and actuates the open-close valve 61.

Through the link 18, the control valve 14 opens interlockingly with the throttle valve 6, to an extent approximately proportional to the opening of said throttle valve 6.

The flow rate of the exhaust-gas recirculated from the exhaust passage through the exhaust-gas recirculation passage 7 into the intake manifold 1 is first regulated by the control valves 15 and 16, then by the control valve 14.

The control valve 16 regulates the relatively smaller exhaust-gas recirculation mainly under low-load conditions, and the control valve 15 regulates the exhaust-gas recirculation mainly under medium- and high-load conditions.

Next, an example of the operation of the control valves 15 and 16 will be described by reference to a power output chart in FIG. 6, in which a solid line E indicates the full-open power output that is developed when the throttle valve 6 opens full, and a solid line F indicates the idling power output (at the throttle valve 6 opening of 3°, for instance).

The control valve 16, on which the dis-boost acts, closes in the operating range on the left of a dotted line G, and opens proportionally to the level of the dis-boost on the right thereof. The control valve 15, on which the EGR boost acts, closes on the left of a dot-dash line H, and opens proportionally to the level of the EGR boost on the right thereof. During idling or full throttle opening when the production of nitrogen oxides is low, the control valves 15 and 16 close to prevent oscillations in the engine body caused by the unstable combustion during idling and a drop in power output at full throttle opening.

Exhaust-gas is recirculated by a pressure difference between the exhaust-gas pressure and intake manifold vacuum. Therefore, if the resistance to flow in the exhaust-gas recirculation passage 7 is equal, the quantity of exhaust-gas recirculated increases with decreasing opening of the throttle valve 6 and increasing intake manifold vacuum. Consequently, the recirculated exhaust-gas becomes excessive in the low-load range, and insufficient in the medium- to high-load range. This inconvenience, however, can be overcome by the characteristic of the control valve 14 to increase its opening in accordance with rise in the engine power output.

When the engine is cold (for instance, when the water temperature in the cooling water passage 47 is under 70° C), the valve body 51 of the thermostatic valve 48 is open, and the air is introduced through the open-to-atmosphere port 53 into the open-to-atmosphere passages 54, 55 and 66. The air in the passage 54 then flows through the vacuum passage 75 to the vacuum chamber 30 to close the control valve 16. At the same time, the air flows through the passage 74 with the orifice 79 into the vacuum passage 71 to lower the dis-boost introduced to the vacuum chamber 73 of the vacuum-type ignition advancer 72. Therefore, the vacuum advancing of the distributor is delayed by the lowered dis-boost amount, thus developing a low-advance condition.

The air in the open-to-atmosphere passage 55 flows through the vacuum passages 77 and 64 into the vacuum chamber 63. The pressure in the vacuum chamber 63 then becomes substantially atmospheric, since the influence of the VCU vacuum occurring in the port 13 is offset by the orifice-like function of said port 13. Urged by the spring 65, the open-close valve 61 closes the open-to-atmosphere passages 58, 59 and 60.

The air in the open-to-atmosphere passage 56 flows through the vacuum passage 76 into the vacuum chamber 25. Since the influence of the EGR vacuum is offset by the orifice-like function of the ports 11 and 12, the pressure in the vacuum chamber 25 becomes substantially atmospheric to close the control valve 15.

Accordingly, during warm-up with cold engine, the vacuum advancing of the distributor is delayed and the exhaust temperature is elevated. Therefore, if an exhaust-gas purifying unit, such as a catalytic converter and thermal reactor, is provided in the exhaust passage, the temperature elevation of the unit is accelerated, thus reducing the emission of hydrocarbons and carbon monoxide during warm-up. Since the control valves 15 and 16 close to stop exhaust-gas recirculation, the impairment of driveability is prevented. Further, the opening of the control valve 34 in the high-speed drive, described later, is stopped, thus preventing the lowering of overtaking performance.

During high-speed operation after warm-up (with the cooling water temperature above 70° C), as in the operating range on the right of a double-dot-dash line J in FIG. 2, th VCU vacuum in the port 13 becomes high enough to open the open-close valve 61, thus introducing the air through the open-to-atmosphere port 70 into the open-to-atmosphere passages 58, 59 and 60.

The air in the open-to-atmosphere passage 58 flows through the vacuum passage 76 into the vacuum chamber 25. Since the EGR vacuum likewise exercises little influence, the pressure in the vacuum chamber 25 becomes substantially atmospheric to close the control valve 15.

The air in the open-to-atmosphere passages 59 flows into the vacuum chamber 39 of the differential-pressure responsive device 36. Part of the air leaks through the vacuum passage 45 to the vacuum passage 46 and the vacuum chamber 38, but exercises little influence due to the presence of the orifice 44. Therefore, the pressure in the vacuum chamber 39 becomes substantially atmospheric. Meanwhile, the intake manifold vacuum is introduced through the vacuum passage 46 into the vacuum chamber 38. Accordingly, a pressure difference between the two vacuum chambers 38 and 39 opens the control valve 34.

The air in the open-to-atmosphere passage 60 flows through the vacuum passage 75 into the vacuum chamber 30. The pressure in the vacuum chamber 30 thus becomes substantially atmospheric to close the control valve 16. At this time, the dis-boost remains unaffected due to the presence of the orifice 78.

Accordingly, under high-speed operating conditions after warm-up, the control valves 15 and 16 close to stop the recirculation of the exhaust-gas as in the case of warm-up. But the control valve 34 opens to supply the air through the air passage 33 to downstream of the throttle valve 6, which prevents lowering of power output, impairment of overtaking performance and overheat of the exhaust system that might otherwise be caused by the exhaust-gas recirculation. The dilution of air-fuel mixture thus attained is conducive to reducing nitrogen oxides emissions, improving mileage, and inhibiting knocking due to preignition. The orifice 66 and check valve 67 provided in the vacuum passage 64 of the valve control device 57 causes a delay in the transmission of the VCU vacuum, which occurs in the port 13 during the transition from low-speed to high-speed, to the vacuum chamber 63, thus keeping the open-close valve 61 unopened for some time after the engine has shifted to the high-speed operation. This eliminates a rapid change in the air-fuel ratio for some time during acceleration, and thus prevents the impairment of driveability. Besides, since the stoppage of exhaust-gas recirculation is delayed, emission of nitrogen oxides, which is liable to increase especially during acceleration, is reduced. When, in contrast, shifting from high-speed to low-speed, the VCU vacuum in the port 13 drops. Since the decreased vacuum is transmitted to the vacuum chamber 63 through the check valve 67, no delay arises. The open-close valve 61 therefore closes simultaneously with the transition to low-speed. Accordingly, emission of nitrogen oxides during deceleration is sufficiently reduced by exhaust-gas recirculation.

In the above-described embodiment, shifting from exhaust-gas recirculation to air supply and vice versa can be accomplished smoothly and uninterruptedly, both during acceleration and deceleration. Besides good driveability is insured during such speed-change, since no sharp, temporary power-output fluctuation occurs.

Figure 7:
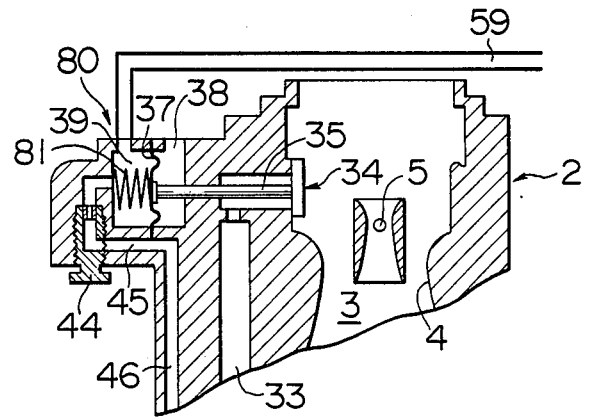
FIG. 7 is a partial cross-sectional view showing a modification of the first embodiment.

FIG. 7 illustrates a modified embodiment of the differential-pressure responsive device 36 in the abovedescribed first embodiment. This modified differential-pressure responsive device 80 comprises two chambers 38 and 39 separated by a diaphragm 37, of which only the chamber 38 opens to the atmosphere. The other chamber 39 communicates with the vacuum passage 48 through the vacuum passage 45 having the orifice 44 and also with the open-to-atmosphere passage 59. The chamber 39 also contains a spring 81 that urges the diaphragm 37 in the direction to open the valve body 34. In this modified embodiment, the intake manifold vacuum is introduced into the vacuum chamber 39 during deceleration and low-speed operation, whereby the diaphragm 37 is drawn against the force of the spring 81 to close the control valve 34. During high-speed operation, the air is supplied through the open-to-atmosphere passage 59, which lowers the vacuum in the chamber 39 and, thus, opens the control valve 34.

Figure 8:
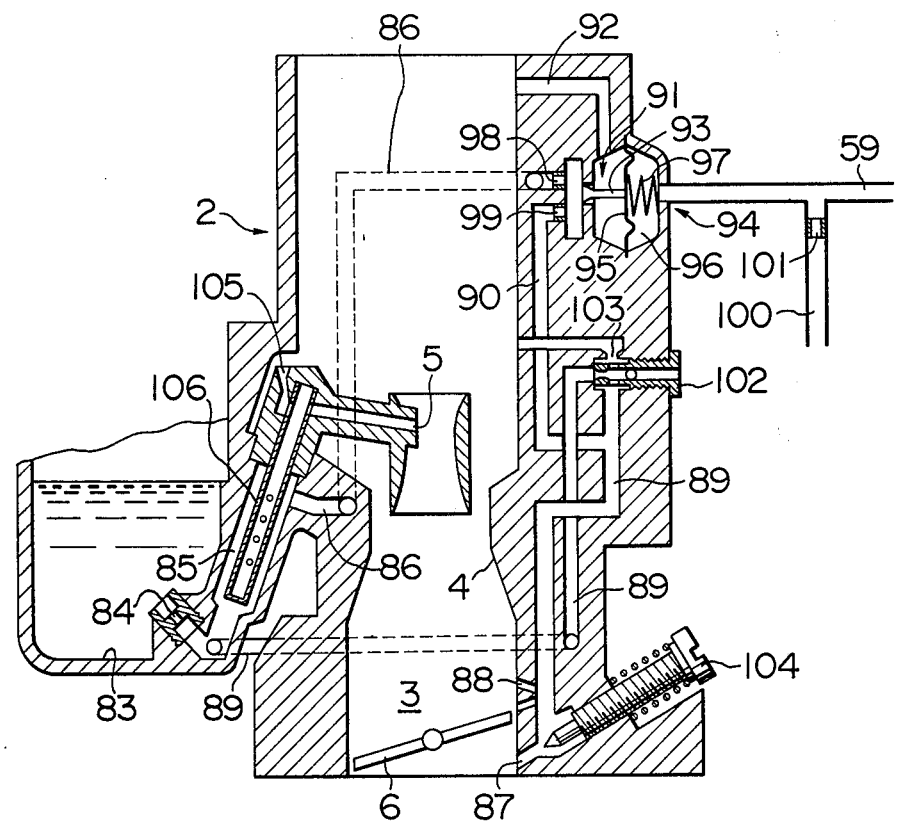
FIG. 8 is a partial cross-sectional view of a second embodiment of this invention.

A second embodiment of this invention shown in FIG. 8 comprises a conventional, ordinary carburetor 2 equipped with an air-fuel mixture diluting unit of the construction to be described hereunder, in place of the air passage 33, control valve 34 and differential-pressure responsive device 80 in the above-described first embodiment.

Said air-fuel mixture diluting unit is constructed as follows: One end of an air passage 86 opens into a main fuel passage 85 that introduces the fuel from a float chamber 83 through a main jet 84 to the main nozzle 5 opening to the inner venturi of the venturi 4. One end of an air passage 90 opens into a slow fuel passage 89 that is branched from the main fuel passage 85 to introduce the fuel to an idle port 87 or a slow port 88. The other ends of said two air passages 86 and 90 communicate through a control valve 91 with an open-to-atmosphere port 92 opening into the intake passage 3 upstream of the venturi 4.

A valve body 93 of the control valve 91 is actuated by a differential-pressure responsive device 94. The valve body 93 is fixed to the center of a diaphragm 95 in said device 94. A vacuum chamber 96 communicates with the open-to-atmosphere passage 59 in the above-described first embodiment. A spring 97 in the vacuum chamber 96 urges the valve body 93 in the opening direction.

To the intermediate point of the open-to-atmosphere passage 59 is connected a vacuum passage 100 that introduces the intake manifold vacuum through an orifice 101.

Reference numeral 98 designates an orifice in the air passage 86, 99 an orifice in the air passage 90, 105 a main air jet, 106 a bleed pipe, 102 a pilot jet, 103 a pilot air jet, and 104 an adjust-screw.

In this arrangement, as shown in FIG. 8 the intake manifold vacuum flows through the vacuum passage 100 and open-to-atmosphere passage 59 into the vacuum chamber 96 during low-speed operation when the valve body 61 of the valve control device 57 in FIG. 1 is closed. Against the force of the spring 97, the vacuum thus introduced draws the diaphragm 95 to the right in FIG. 8, thus closing the control valve 91 and cutting off the air flow from the air passages 86 and 90 to the main and slow systems. Therefore, ordinary air-fuel mixing operation takes place in the carburetor 2. Meanwhile, during high-speed operation when the valve body 61 opens, the air is introduced through the open-to-atmosphere passage 59. Unaffected by the intake manifold vacuum due to the presence of the orifice 101, the pressure in the vacuum chamber 96 becomes substantially atmospheric. Then, the control valve 91 is opened by the force of the spring 97, the air is introduced through the open-to-atmoephere port 92 to the air passages 86 and 90, and the fuel in the main and slow systems are bled. Consequently, the quantities of the fuel injected from the main nozzle 5, idle port 87 and slow port 88 are decreased, and the air-fuel mixture is diluted.

What is claimed is:

1. An intake regulator for an internal combustion engine comprising means defining an exhaust-gas recirculation passage connecting an exhaust passage with an intake passage to recycle part of the exhaust-gas back to the intake passage, a recirculated exhaust-gas control valve in said exhaust-gas recirculation passage for controlling the quantity of the recirculated exhaust-gas, differential-pressure responsive means actuating said recirculated exhaust-gas control valve by a vacuum established in a vacuum chamber thereof leading to the intake passage, an air passage for diluting air-fuel mixtures by supplying air into the intake passage or the fuel passage in the carburetor, an air control valve in said air passage for controlling the quantity of air supply, differential-pressure responsive means actuating said air control valve by a vacuum established in a vacuum chamber thereof leading to the intake passage, means defining open-to-atmosphere passages leading from each of said two vacuum chambers, and valve control means closing either of said recirculated exhaust-gas control valve and said air control valve when the other is open by opening and closing said open-to-atmosphere passages.

2. An intake regulator for internal combustion engine according to claim 1, wherein the recirculated exhaust-gas control valve is adapted to open proportionally to the level of vacuum introduced into its differential-pressure responsive means and the air control valve to close in the low-speed engine operating range, and the recirculated exhaust-gas control valve to close and the air control valve to open in the highspeed engine operating range.

3. An intake regulator for internal combustion engine according to claim 1, wherein the valve control means comprises an open-close valve simultaneously opening and closing said open-to-atmosphere passages, a flexible diaphragm actuating said open-close valve, a vacuum chamber formed on one side of said flexible diaphragm, and a vacuum passage introducing a vacuum, occurring in a port formed in the intake passage wall slightly upstream of the throttle valve, to said vacuum chamber.

4. An intake regulator for internal combustion engine according to claim 3, wherein an orifice and a check valve are disposed in parallel in the vacuum passage introducing the control vacuum to the vacuum chamber of the valve control means.

5. An intake regulator for internal combustion engine according to claim 3, wherein an open-to-atmosphere passage is connected to the vacuum chamber of the valve control means and a thermostatic valve adapted to open only when the engine is cold by detecting the engine temperature is provided in said passage.

6. An intake regulator for internal combustion engine according to claim 1, wherein the air passage leads from the atmosphere or the intake passage upstream of the carburetor throttle valve to the intake passage downstream thereof, the differential-pressure responsive means to actuate the air control valve comprises a flexible diaphragm actuating said air control valve, a pair of vacuum chambers on both sides of said flexible diaphragm, a spring urging said air control valve in the closing direction, and a vacuum passage communicating with one of said paired vacuum chambers directly and the other through an orifice and a check valve disposed in parallel and opening to the intake passage downstream of said throttle valve, and an open-to-atmosphere passage opened and closed by the valve control means is connected with said the other vacuum chamber.

7. An intake regulator for internal combustion engine according to claim 1, wherein the air passage is connected with the intermediate point of the main or slow fuel passage of the carburetor.

* * * * *